US012724533B2

(12) United States Patent
Xu et al.

(10) Patent No.: US 12,724,533 B2
(45) Date of Patent: Sep. 1, 2026

(54) NVME DATA TRANSMISSION WITH DATA COMPRESSION

(71) Applicant: Beijing Volcano Engine Technology Co., Ltd., Beijing (CN)

(72) Inventors: Peng Xu, Los Angeles, CA (US); Fei Liu, Los Angeles, CA (US); Kyoungryun Bae, Los Angeles, CA (US); Wei Tang, Los Angeles, CA (US); Jin Kim, Los Angeles, CA (US); Yahui Feng, Los Angeles, CA (US); Prathamesh Amritkar, Los Angeles, CA (US); Peng Liu, Beijing (CN); Guojun Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 14 days.

(21) Appl. No.: 18/812,930

(22) Filed: Aug. 22, 2024

(65) Prior Publication Data

US 2026/0056657 A1 Feb. 26, 2026

(51) Int. Cl.
*G06F 3/06* (2006.01)

(52) U.S. Cl.
CPC .......... *G06F 3/0608* (2013.01); *G06F 3/0659* (2013.01); *G06F 3/067* (2013.01)

(58) Field of Classification Search
CPC ....... G06F 3/0608; G06F 3/0659; G06F 3/067
See application file for complete search history.

(56) References Cited

U.S. PATENT DOCUMENTS

2012/0072641 A1* 3/2012 Suzuki .................... G06F 3/064 711/E12.008
2017/0269858 A1* 9/2017 Nimmagadda ..... G06F 11/1004
2018/0018100 A1* 1/2018 Aho ........................ G06F 3/064
2022/0405200 A1* 12/2022 Karr ........................ G06F 3/067
2022/0413765 A1* 12/2022 Lalsangi ................. G06F 3/067
2025/0190378 A1* 6/2025 Kim .................... G06F 12/0246

* cited by examiner

*Primary Examiner* — Eric Cardwell
(74) *Attorney, Agent, or Firm* — Alleman Hall LLP

(57) ABSTRACT

A method for data transmission is provided. The method includes, at an initiator computing device, receiving a data payload to be transmitted to a target computing device for storage using the nonvolatile memory express over fabric (NVMe-oF) protocol, wherein the data payload is represented as a plurality of logical blocks. Using a compression engine, the data payload is compressed into a plurality of physical blocks having a smaller total data size than the plurality of logical blocks. A write request is transmitted to the target computing device, the write request including the plurality of physical blocks, and metadata specifying a correspondence between each logical block of the plurality of logical blocks and one or more corresponding physical blocks of the plurality of physical blocks.

20 Claims, 6 Drawing Sheets

NVME DATA TRANSMISSION WITH DATA COMPRESSION

BACKGROUND

Non-Volatile Memory Express (NVMe) is a data storage interface that provides software applications with high-speed and low-latency access to computer storage hardware. However, the benefits of NVMe are typically confined to the local environment of a single server due to its design for direct-attached storage. To extend the advantages of NVMe across a broader networked environment, NVMe over Fabric (NVMe-oF) was developed. NVMe-oF enables NVMe commands to be transmitted over a variety of network fabrics, such as ethernet, fiber channel, and Remote Direct Memory Access (RDMA).

SUMMARY

According to one aspect of the present disclosure, a method for data transmission is provided. The method includes, at an initiator computing device, receiving a data payload to be transmitted to a target computing device for storage using the nonvolatile memory express over fabric (NVMe-oF) protocol, wherein the data payload is represented as a plurality of logical blocks. Using a compression engine, the data payload is compressed into a plurality of physical blocks having a smaller total data size than the plurality of logical blocks. A write request is transmitted to the target computing device, the write request including the plurality of physical blocks, and metadata specifying a correspondence between each logical block of the plurality of logical blocks and one or more corresponding physical blocks of the plurality of physical blocks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
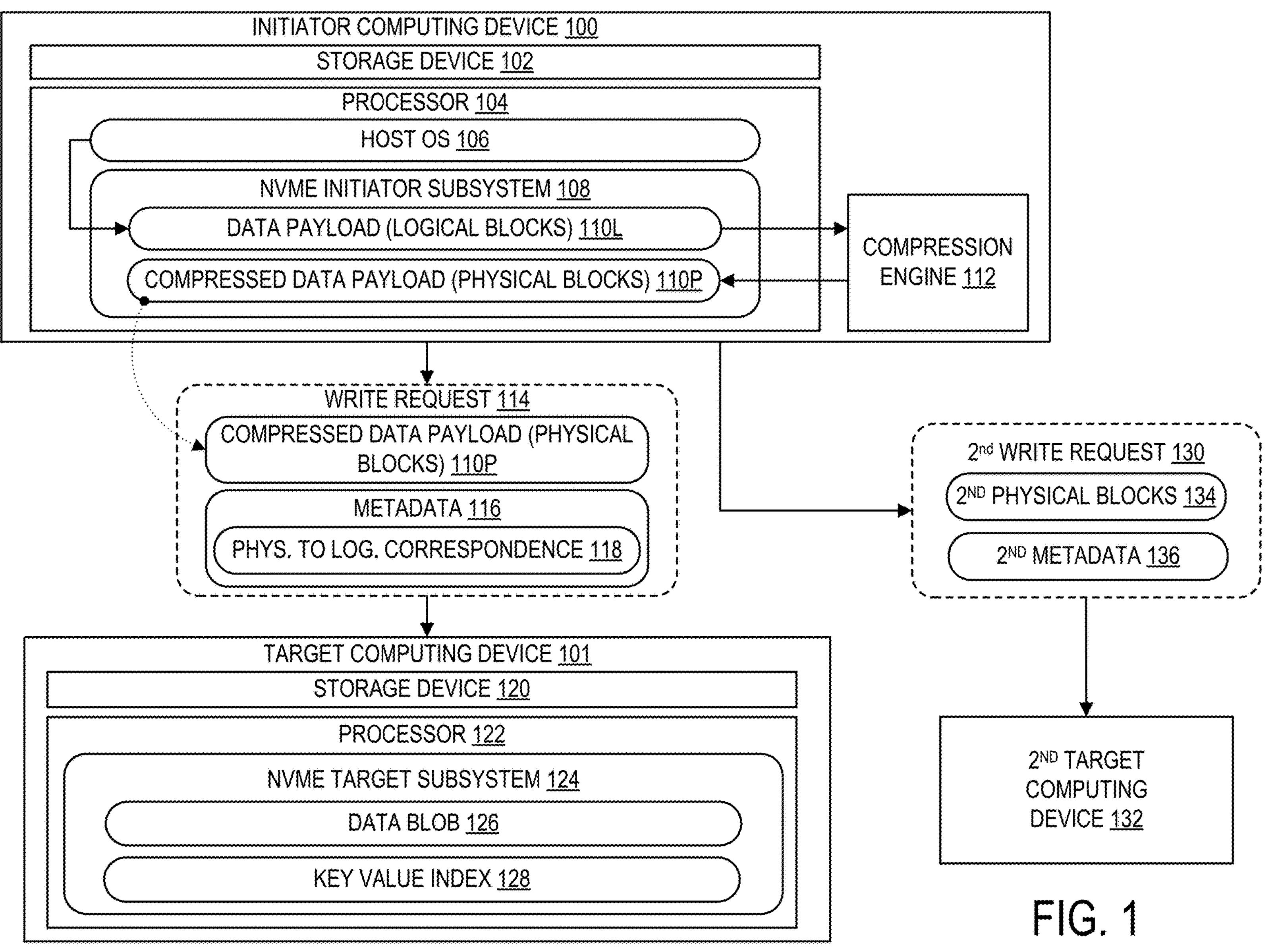
FIG. 1 shows a schematic view of an example computing environment including an initiator computing device and a target computing device.

Non-Volatile Memory Express (NVMe) is referred to as a "block-based" protocol, as NVMe input/output (IO) commands (e.g., read requests, write requests) operate on units of data having a predetermined size, called "logical blocks." For instance, as examples, each logical block may have a size of 512B or 4096B, or any other suitable size depending on the implementation. This is also the case in Non-Volatile Memory Express over Fabric (NVMe-oF), which enables NVMe IO commands to be transmitted over a network fabric between an initiator computing device and a target computing device. Generally, when an initiator computing device writes data to and/or reads data from a target computing device using NVMe-oF, the data payload is specified in terms of whole logical blocks, each having the same predetermined block size, and each having a unique logical block address (LBA).

As a result, when a data payload is generated (e.g., by a software application executed by a host operating system on the initiator computing device), the data payload is in some cases padded out to fill an integer number of logical blocks. For instance, a data payload of 3 KB may be padded out to a total length of 4096B, such that it can be transmitted as a single whole logical block. This means that, for a given logical block that is transmitted over a network fabric, the data encoded in the logical block could in some cases be compressed to a smaller data size, thereby representing the same data payload using a smaller quantity of bits. Such compression can reduce the amount of bandwidth consumed for transmitting the data payload, and also reduce the amount of storage space used for storing the data payload at the target computing device.

However, this is complicated by the fact that the initiator computing device and target computing device both expect to operate on data payloads that are defined as integer numbers of logical blocks, according to the NVMe-oF protocol. As such, with respect to NVMe-oF, compression is typically only applied at the target computing device, after the data payload has already been transmitted across the network fabric as a plurality of logical blocks. Alternatively, if applied at the initiator computing device, compression typically requires manual intervention and configuration by a human user.

Accordingly, the present disclosure is directed to techniques for NVMe-oF data transmission, in which a data payload may be automatically compressed prior to transmission to a target computing device. Specifically, an initiator computing device receives a data payload represented as a plurality of logical blocks, to be transmitted to a target computing device for storage. For instance, the data payload may be provided by a host operating system executed by the initiator computing device. Using a compression engine, the plurality of logical blocks are compressed into a plurality of "physical blocks," referring to units of data that have a smaller size than the logical blocks. In other words, after compression into the plurality of physical blocks, the data payload is represented using fewer total bits of data. This beneficially conserves network bandwidth when the data payload is transmitted over the network fabric, as compared to an alternate scenario where the data payload is transmitted as logical blocks.

Additionally, the initiator computing device generates a set of metadata that specifies a correspondence between the original plurality of logical blocks, and the set of physical blocks into which the data payload is compressed. The metadata is transmitted from the initiator computing device to the target computing device, along with the physical block representation of the data payload. For instance, the metadata may specify, for each logical block, the quantity of corresponding physical blocks representing that logical block. As a result, by referencing the metadata, an NVMe-oF IO command targeting a specified logical block can be resolved to one or more physical blocks representing the logical block.

The techniques described herein provide the technical benefit of conserving computational resources by reducing the amount of network bandwidth consumed by sending data payloads between NVMe-oF initiators and targets. Furthermore, the amount of data storage capacity used by the target computing device to store the data payload is reduced, by storing the data payload as a plurality of physical blocks rather than as a plurality of logical blocks. This is equivalent to an increase in available network bandwidth and computer storage capacity, representing an improvement in computer technology. Furthermore, the techniques described herein beneficially enable the compression to be applied invisibly from the perspective of the user—e.g., enabling automatic compression, rather than requiring manual intervention. This beneficially improves human-computer interaction.

FIG. 1 schematically shows an example initiator computing device 100. Computing device 100 includes a storage device 102 and a processor 104. The storage device holds instructions executable by the processor. As examples, the processor may include one or more central processing units (CPUs), graphics processing units (GPUs), tensor units, application-specific integrated circuits (ASICs), and/or other types of processing devices. The storage device 102 may include volatile memory and/or non-volatile storage. In general, a computing device as described herein may have any suitable capabilities, hardware configuration, and form factor. In some examples, initiator computing device 100 is implemented as computing system 700 described below with respect to FIG. 7.

The initiator computing device 100 is communicatively coupled with a target computing device 101. As will be described in more detail below, the initiator computing device 100 may generate NVMe-oF IO commands (such as read requests and write requests) to be fulfilled by the target computing device. It will be understood that a given network environment may include any suitable number of one or more initiator computing devices and target computing devices. Furthermore, such computing devices may be communicatively coupled via any suitable network fabric, using any suitable underlying network hardware.

As shown in FIG. 1, initiator computing device 100 includes a host operating system (OS) 106. In general, a host operating system refers to software used to manage hardware resources of the computing device, and provide a platform for running applications. In some examples, an initiator computing device may include two or more operating systems, any or all of which may use NVMe-oF to write data to, and/or read data from, other computing devices in the same network environment. Host operating systems running on the initiator computing device 100 may run directly on the physical hardware (e.g., bare metal), and/or may be implemented through virtualization (e.g., via virtual machines or containers).

The initiator computing device 100 also includes an NVMe initiator subsystem 108. An NVMe initiator subsystem refers to any hardware, software, and/or firmware components of the initiator computing device that are useable to carry out NVMe-oF IO commands originating from the host operating system. In some examples, the NVMe initiator subsystem may include a network interface card (NIC), processor, computer memory, physical network fabric interfaces (e.g., ethernet port), software drivers in the host operating system, etc. As one example, the NVMe initiator subsystem may be implemented as the communication subsystem 712 described below with respect to FIG. 7.

The NVMe initiator subsystem receives a data payload 110L to be transmitted to a target computing device for storage using the NVMe-oF protocol. As discussed above, the data payload is initially expressed as a plurality of logical blocks, having any suitable predefined block size. For instance, logical blocks may have a size of 512B or 4096B, as non-limiting examples. The size of each logical block may in some cases be defined by the NVMe namespace to which the NVMe write command is directed. In some scenarios, the data payload generated by the host OS may be padded out until it fills an integer number of logical blocks, such that the minimum size of the logical block representation of the data payload 110L is one logical block.

As shown in FIG. 1, the initiator computing device uses a compression engine 112 to compress the logical block representation 110L of the data payload into a physical block representation 110P of the data payload. In other words, the data represented by each logical block may be compressed such that it is now represented by or more physical blocks, each having a smaller block size than the logical blocks. For instance, in one example, the contents of a single logical block may now be represented by three different physical blocks, while still having a smaller total size than the original logical block.

The physical blocks may have any suitable block size. As one non-limiting example, the physical blocks may have a size of 1024B. However, different suitable physical block sizes may be used in different implementations. Furthermore, different physical block sizes may be used for different NVMe namespaces. In other words, in some examples, the size of each physical block of the plurality of physical blocks is defined in an NVMe namespace of the target computing device. In some examples, the initiator computing device may send write requests to two or more different NVMe namespaces, implemented on the same or different target computing devices, and each having a different physical block size.

The compression engine may be implemented in any suitable way. In general, the compression engine is implemented as any suitable combination of computer hardware, software, and/or firmware useable to compress a data payload expressed in logical blocks, into a smaller data payload expressed in physical blocks. In some examples, the compression engine may be implemented partially or entirely through computer hardware—e.g., an application-specific integrated circuit (ASIC), field-programmable gate array (FPGA), system-on-chip (SoC), and/or other suitable hardware platform. Additionally, or alternatively, the compression engine may be implemented in software—e.g., as an application running on host operating system 106 and/or other software components of the initiator computing device. The compression engine may use any suitable compression algorithms for compressing the data payload into physical blocks.

After compression, the physical block representation 110P of the data payload is transmitted to target computing device 101 as part of a write request 114. The write request may include any suitable data according to the NVMe-oF protocol. Typically, for IO commands (e.g., read requests, write requests), Command Dword 1 (CDW1) is used to specify the number of logical blocks represented by the write request. CDW10 and CDW11 are used to specify the starting logical block address (LBA), where each individual logical block has its own unique LBA. CDW12 is used to specify the number of logical blocks.

According to the techniques disclosed herein, the NVMe-oF protocol may be extended to enable transmission of the data payload as physical blocks rather than as logical blocks. For instance, bits of the LBA format data structure may be used to specify the size of the physical blocks. In one example implementation, bits 15:00 of the LBA format data structure may be used to define the size of the metadata field provided for each unique LBA, bits 23:16 may be used to specify the supported LBA size, bits 25:24 may be used to specify the relative performance of the LBA format as comparted to other supported LBA performance, and bits 31:26 may be used to specify the physical block size. In an example approach, the physical block size may range between a minimum value of 64B to a maximum value of 32 KB.

In generating NVMe IO commands, the initiator computing device may in some cases generate a submission queue entry (SQE), which is a data structure representing IO commands to be fulfilled by the target computing device. According to the techniques described herein, a new field may be defined in the data format of the SQE to specify the size of the data payload in physical blocks. For instance, in one example approach, bits 63:48 of CDW2 and CDW3 may be used to store the size of the data payload in physical blocks.

In FIG. 1, the write request 114 is transmitted to the target computing device. The write request includes the plurality of physical blocks 110P representing the data payload. Additionally, the write request includes metadata 116, which specifies a correspondence 118 between each logical block of the plurality of logical blocks, and one or more corresponding physical blocks of the plurality of physical blocks. In other words, as each logical block can be accessed independently, the metadata may be used to identify the physical block counterparts to each logical block. In NVMe-oF, metadata may be defined separately for each logical block. For instance, the write request may include an 8B metadata field corresponding to each unique LBA. As such, in some examples, the metadata 116 may include a plurality of different metadata fields, for each of the plurality of logical blocks represented by the write request. In one example, the metadata specifies the quantity of physical blocks corresponding to each logical block. For instance, for a given logical block, the metadata may specify that two physical blocks in the data payload correspond to that logical block. In this way, the write request may specify a quantity of the plurality of logical blocks, and a quantity of the plurality of physical blocks representing the data payload.

Figures 2, 3:
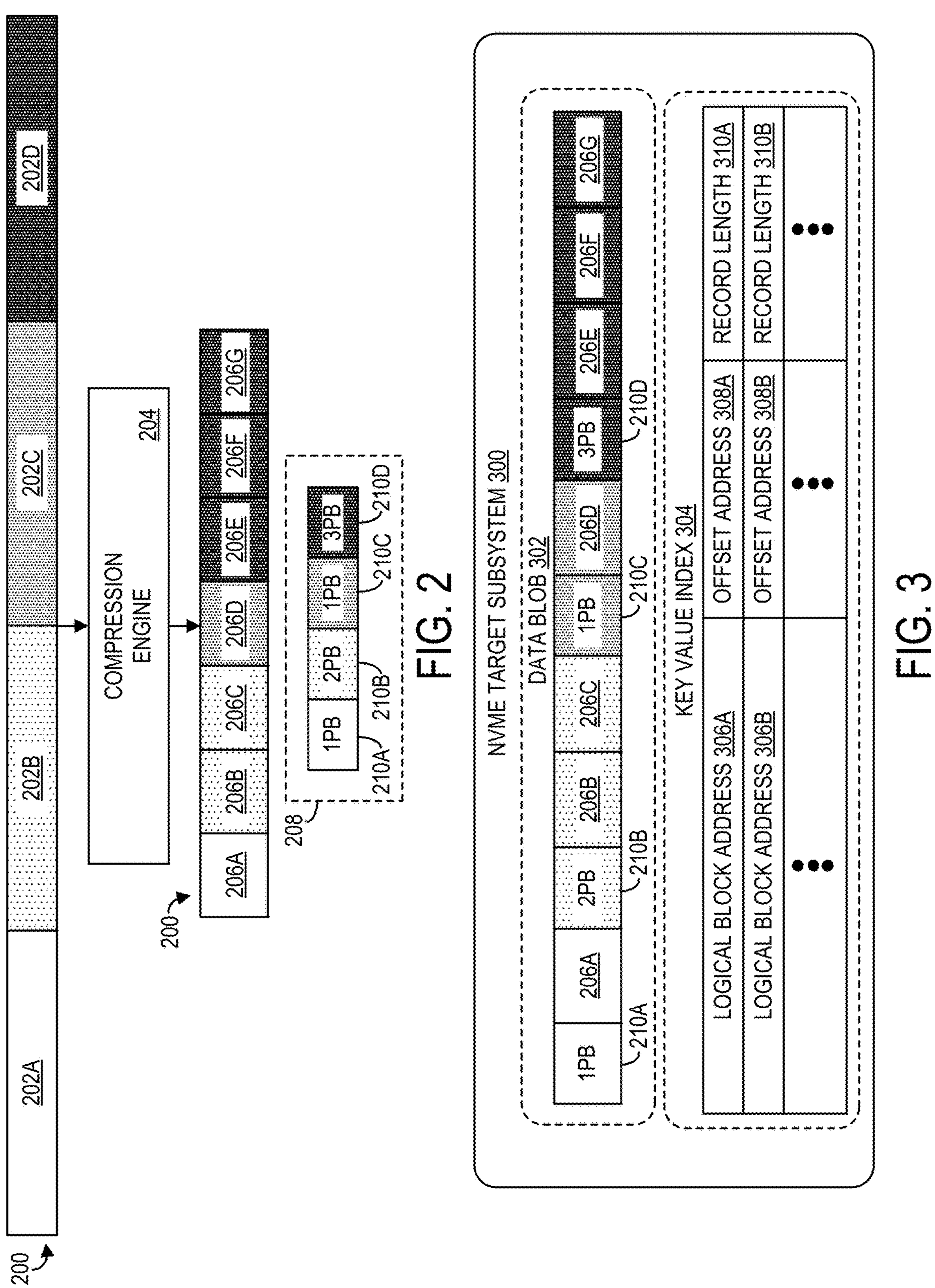
FIG. 2 schematically illustrates compression of a plurality of logical blocks representing a data payload to a plurality of physical blocks.
FIG. 3 schematically depicts storage of physical blocks representing a data payload.

The compression of logical blocks into physical blocks is schematically illustrated with respect to FIG. 2. Specifically, FIG. 2 schematically represents a data payload 200 as four different logical blocks 202A, 202B, 202C, and 202D, each having the same predetermined block size. While four logical blocks are used in FIG. 2, it will be understood that this is a non-limiting example, and that a data payload may be expressed as any suitable number of one or more logical blocks prior to compression.

The logical blocks 202A-202D are provided to a compression engine 204, which compresses the data payload 200 into a plurality of physical blocks. In this example, the data payload is compressed into seven physical blocks 206A-206G, although it will be understood that this is non-limiting. As shown, the physical blocks have a smaller block size than the physical blocks. Furthermore, after compression, the overall size of the data payload 200 is reduced—e.g., the same payload is represented using fewer bits of data.

Notably, different logical blocks may be compressed into different numbers of physical blocks, depending on the nature of the data encoded in each logical block. In FIG. 2, fill patterns are used to illustrate the correspondence between different physical blocks and logical blocks. As shown, logical block 202A is compressed into a single physical block 206A. Logical block 202B is compressed into two physical blocks 206B and 206C. Logical block 202C is compressed into a single physical block 206D. Logical block 202D is compressed into three physical blocks 206E, 206F, and 206G. It will be understood that this scenario is a non-limiting example. In general, a logical block may be compressed into any suitable number of one or more corresponding physical blocks, depending on the nature of the data payload, the block size of the logical blocks, and the block size of the physical blocks.

Additionally, as discussed above, the initiator computing device generates a set of metadata 208, which specifies the correspondence between the logical blocks and physical blocks. In FIG. 2, metadata 208 includes four different metadata fields 210A, 210B, 210C, and 210D, respectively corresponding to the four logical blocks 202A-202D. As shown, each metadata field specifies the quantity of physical blocks corresponding to that logical block—e.g., metadata field 210A indicates that logical block 202A is represented by one physical block, metadata field 210B indicates that logical block 202B is represented by two physical blocks, and so on. In this manner, if an NVMe-oF read request later targets any of the logical blocks, the metadata 208 can be used to determine which of the physical blocks include the requested data.

Returning briefly to FIG. 1, the write request 114 is transmitted from the initiator computing device 100 to the target computing device 101. As with the initiator computing device, the target computing device includes a storage device 120, and a processor 122. The storage device holds instructions executable by the processor. As examples, the processor may include one or more central processing units (CPUs), graphics processing units (GPUs), tensor units, application-specific integrated circuits (ASICs), and/or other types of processing devices. The storage device 120 may include volatile memory and/or non-volatile storage. In some examples, target computing device 101 is implemented as computing system 700 described below with respect to FIG. 7.

The target computing device 101 implements an NVMe target subsystem 124. As with the NVMe initiator subsystem 108, the NVMe target subsystem 124 may be implemented through any suitable hardware, software, and/or firmware components useable to fulfill NVMe-oF IO commands originating from the initiator computing device. In some examples, the NVMe target subsystem may include a network interface card (NIC), processor, computer memory, physical network fabric interfaces (e.g., ethernet port), software drivers in the host operating system, etc. As one example, the NVMe target subsystem may be implemented as the communication subsystem 712 described below with respect to FIG. 7.

After receiving the write request, the target computing device stores the physical block representation 110P of the data payload, along with the metadata 116. Such data may be stored in any suitable way, depending on the implementation. For instance, the target computing device may include any suitable number and variety of data storage devices, configured to store computer data using any suitable underlying storage technologies. The data payload and the corresponding metadata may be distributed between any suitable number of one or more data storage devices. Similarly, the file system, formatting, encoding, etc., used in storing the data payload and metadata may vary, provided that the data is accessible to the initiator computing device via NVMe-oF IO commands.

In some examples, the metadata and the plurality of physical blocks are stored by the target computing device as a data blob. In FIG. 1, the NVMe target subsystem 124 stores the compressed data payload 110P and the metadata 116 in a data blob 126. The NVMe target subsystem also includes a key value index 128 that is useable to determine, for each logical block, the offset address of the corresponding physical block(s) within the data blob.

This scenario is schematically illustrated with respect to FIG. 3, which shows a schematic representation of an NVMe target subsystem 300 of a target computing device. The NVMe target subsystem stores a data blob 302, which includes both the physical blocks 206A-206G and the metadata fields 210A-210D. In this example, each metadata field corresponding to a different logical block precedes the set of physical blocks representing the data of that logical block. In other words, metadata 210A specifies that logical block 202A is represented by a single physical block, and is succeeded in the data blob by physical block 206A. Similarly, metadata 210B specifies that logical block 202B is represented by two physical blocks, and is succeeded in the data blob by the two physical blocks 206B and 206C. It will be understood that this arrangement is a non-limiting example, and that a data blob may be organized in any suitable way.

Furthermore, only one data blob is shown in FIG. 3, although this is non-limiting. In general, a target computing device may store any suitable number of different data blobs, which may correspond to any suitable number of different data payloads.

Additionally, in this example, the target computing device maintains a key value index 304 that specifies, for each logical block, an offset address within the data blob corresponding to the physical blocks that represent the logical block. In FIG. 3, the key value index 304 includes at least two logical block addresses (LBAs) 306A and 306B. These may, for instance, be unique identifiers corresponding to logical blocks 202A and 202B of FIG. 2. LBAs 306A and 306B serve as keys in the key value index, and correspond to offset addresses 308A and 308B. These are addresses within the data blob corresponding to the positions of the physical blocks that represent each logical block. For instance, offset address 308A may specify the starting address of metadata 210A in data blob 302, which indicates that the following one physical block 206A corresponds to logical block 202A. In cases where the target computing device stores more than one data blob, the offset addresses may additionally specify which data blob the physical blocks are stored in—e.g., using a data blob identifier.

Additionally, in FIG. 3, the key value index 304 further specifies a length of the one or more physical blocks within the data blob. As shown, the LBAs 306A and 306B are each associated with corresponding record lengths 310A and 310B. These may indicate the total length of the sequence within the data blob corresponding to each logical block. For instance, record length 310B may specify the length, in bits, of the metadata 210B, physical block 206B, and physical block 206C within data blob 302. In this manner, when provided with a given LBA corresponding to a logical block, the target computing system can reference the key value index to locate the corresponding physical blocks stored in the data blob.

The present disclosure has primarily focused on interaction between a single initiator computing device and a single target computing device. However, as discussed above, this is non-limiting. Rather, a given network environment may have any suitable number of initiator computing devices, which may send NVMe-oF IO commands to any suitable number of target computing devices. For instance, returning briefly to FIG. 1, the initiator computing device 100 additionally transmits a second write request 130 to a second target computing device 132. The second write request includes a second plurality of physical blocks 134, which have been compressed from a set of logical blocks as discussed above (e.g., they may be another representation of the original non-compressed data payload 110L, or may represent another data payload altogether). The metadata 136 specifies a correspondence between the physical blocks 134 and the set of logical blocks from which the physical blocks 134 were compressed.

Furthermore, in this example, the second write request 130 specifies a different NVMe namespace from write request 114. As discussed above, one or more configurable parameters may differ between different NVMe namespaces, such as the physical block length. In other words, the second plurality of physical blocks 134 may have a different block size from the first plurality of physical blocks 110P.

The present disclosure has primarily focused on transmission of a write request from the initiator computing device to the target computing device. However, the initiator computing device may additionally transmit read requests to the target computing device, requesting access to data stored by the target computing device. Such read requests may have any suitable source (e.g., they may originate from a host OS on the initiator computing device), and may refer to the requested data in terms of logical blocks according to the NVMe-oF protocol.

Figures 4A, 4B:
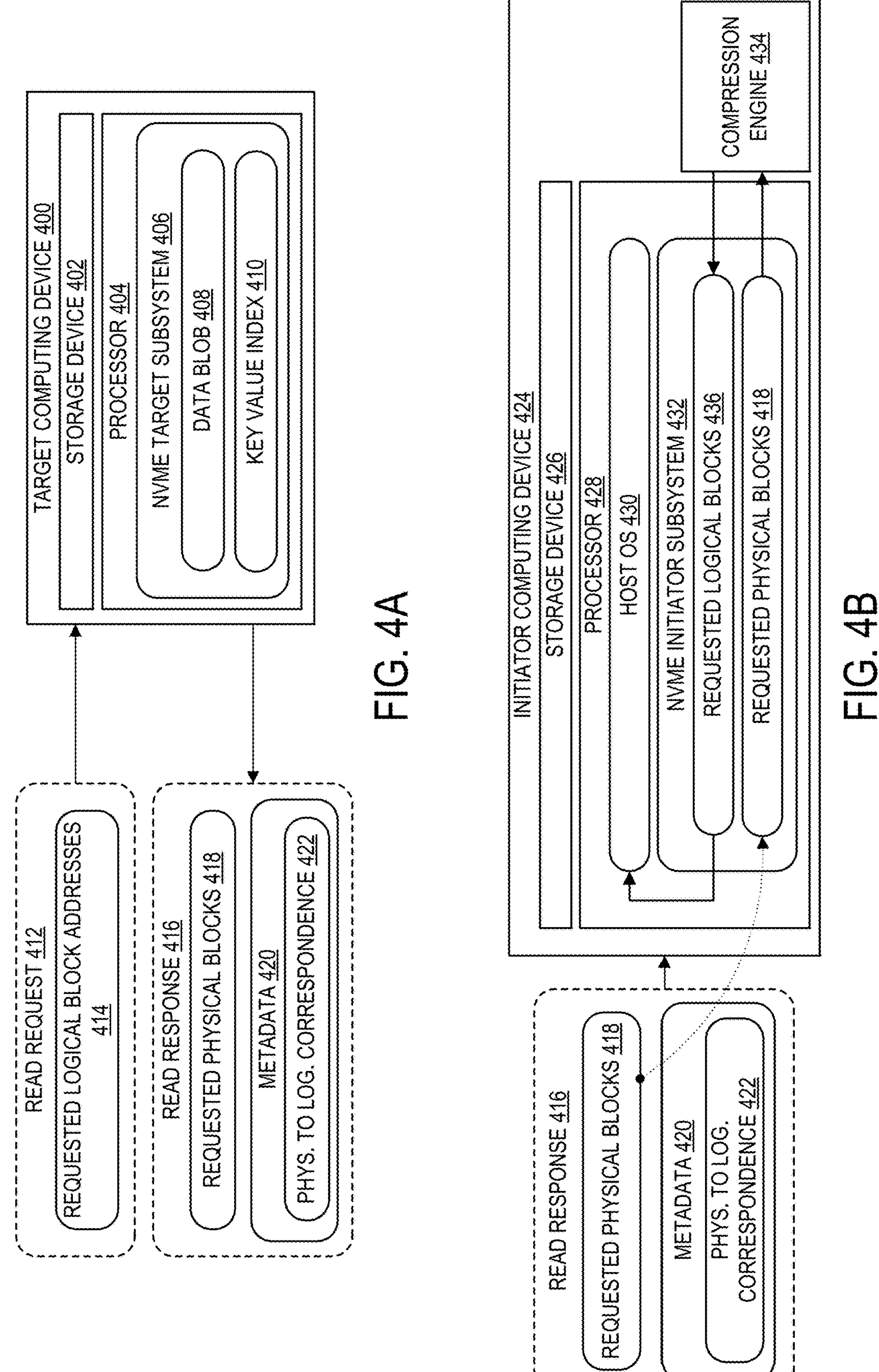
FIGS. 4A and 4B schematically illustrate a target computing device receiving a read request from an initiator computing device.

This is schematically illustrated in more detail with respect to FIGS. 4A and 4B. Specifically, FIG. 4A schematically shows another example target computing device 400, having a storage device 402 and processor 404. The target computing device implements an NVMe target subsystem 406, which stores a data blob 408 and a key value index 410. As discussed above, the data blob includes physical blocks that have previously been compressed from logical blocks—e.g., compression may be applied by an initiator computing device prior to transmitting the physical blocks to the target computing device. The key value index specifies, for each LBA, the position of the corresponding physical blocks within the data blob.

The target computing device 400 receives an NVMe read request 412, transmitted by an initiator computing device. This specifies one or more requested LBAs 414 to be retrieved by the target computing device and transmitted back to the initiator computing device. However, as discussed above, the data corresponding to the requested LBAs was previously compressed into physical blocks, and are stored as physical blocks by the target computing device. Accordingly, using the key value index, the target computing device locates the requested physical blocks within data block 408.

The target computing device then transmits a read response 416 back to the initiator computing device. The read response includes the requested physical blocks 418, along with metadata 420. Similar to metadata 114 sent with the write request, metadata 420 of the read response specifies a correspondence 422 between the requested physical blocks included in the read response, and the requested logical blocks specified by the read request. In a case where two or more logical blocks are requested, the read response will include two or more requested physical blocks corresponding to the two or more requested logical blocks. The metadata may therefore specify which of the two or more requested physical blocks correspond to each requested logical block. For instance, the metadata 420 may be the same metadata that was previously transmitted to the target computing device via a write request, and that was stored along with the physical blocks in the data blob.

FIG. 4B schematically illustrates an initiator computing device 424 receiving the metadata 420. The initiator computing device includes a storage device 426 and a processor 428, which collectively implement a host OS 430 and an NVMe initiator subsystem 432. Initiator computing device 424 previously transmitted the read request 412 to the target computing device 400, and now receives read response 416, which includes requested physical blocks 418 corresponding to the requested logical blocks 414. The NVMe initiator subsystem 432 provides the requested physical blocks 418 to a compression engine 434, which decompresses the requested physical blocks to output the requested logical blocks 436, based on the metadata 420 specifying the correspondence between physical and logical blocks. In this manner, the read request 412 is fulfilled, as the requested logical blocks have been received by the initiator computing device. However, by transmitting the data payload as physical blocks that are decompressed at the initiator computing device, data bandwidth is beneficially conserved.

Figure 5:
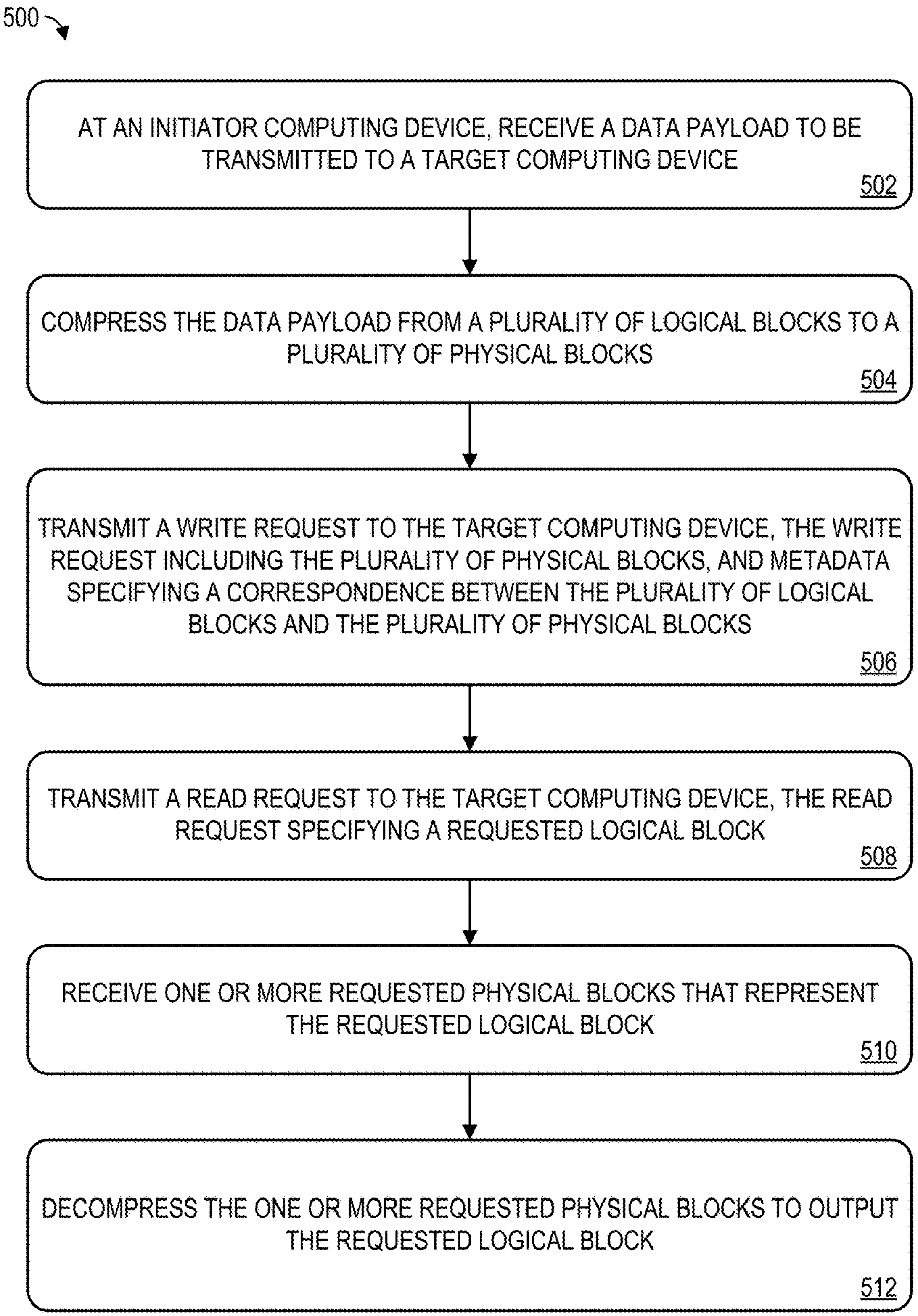
FIG. 5 illustrates an example method for data transmission.

FIG. 5 illustrates an example method 500 for data transmission. Steps of method 500 may be initiated, terminated, and/or looped at any suitable time and in response to any suitable condition. Method 500 is primarily described from the perspective of an initiator computing device. However, it will be understood that method 500 may be performed by any suitable computing system of one or more computing devices. A computing device implementing steps of method 500 may have any suitable capabilities, hardware configuration, and form factor. As one example, method 500 may be implemented as computing system 700 described below with respect to FIG. 7.

At 502, method 500 includes, at the initiator computing device, receiving a data payload to be transmitted to a target computing device via an NVMe-oF write request. The data payload may, for instance, include data generated by a software application running on an operating system of the initiator computing device. In general, however, the data payload may take any suitable form, and originate from any suitable source. The data payload is expressed as a plurality of logical blocks, which may include padding a smaller data payload out to fit within an integer number of logical blocks.

At 504, method 500 includes compressing the data payload from the plurality of logical blocks to a plurality of physical blocks, using a compression engine. The physical blocks have a smaller block size than the logical blocks, such that the data encoded in one logical block may be divided into more than one physical block after compression. However, the total size of the data payload after compression is smaller than the logical block representation of the data payload.

At 506, method 500 includes transmitting a write request to the target computing device. The write request includes the plurality of physical blocks, and metadata specifying a correspondence between the plurality of logical blocks and the plurality of physical blocks. This data may then be stored at the target computing device. For instance, the physical blocks and metadata may be stored together in a data blob.

At 508, method 500 includes transmitting a read request to the target computing device. The read request specifies a requested logical block. At 510, method 500 includes receiving one or more requested physical blocks that represent the requested logical block. At 512, method 500 includes decompressing the one or more requested physical blocks to output the requested logical block.

Figure 6:
FIG. 6 illustrates another example method for data transmission.
Figure 6:
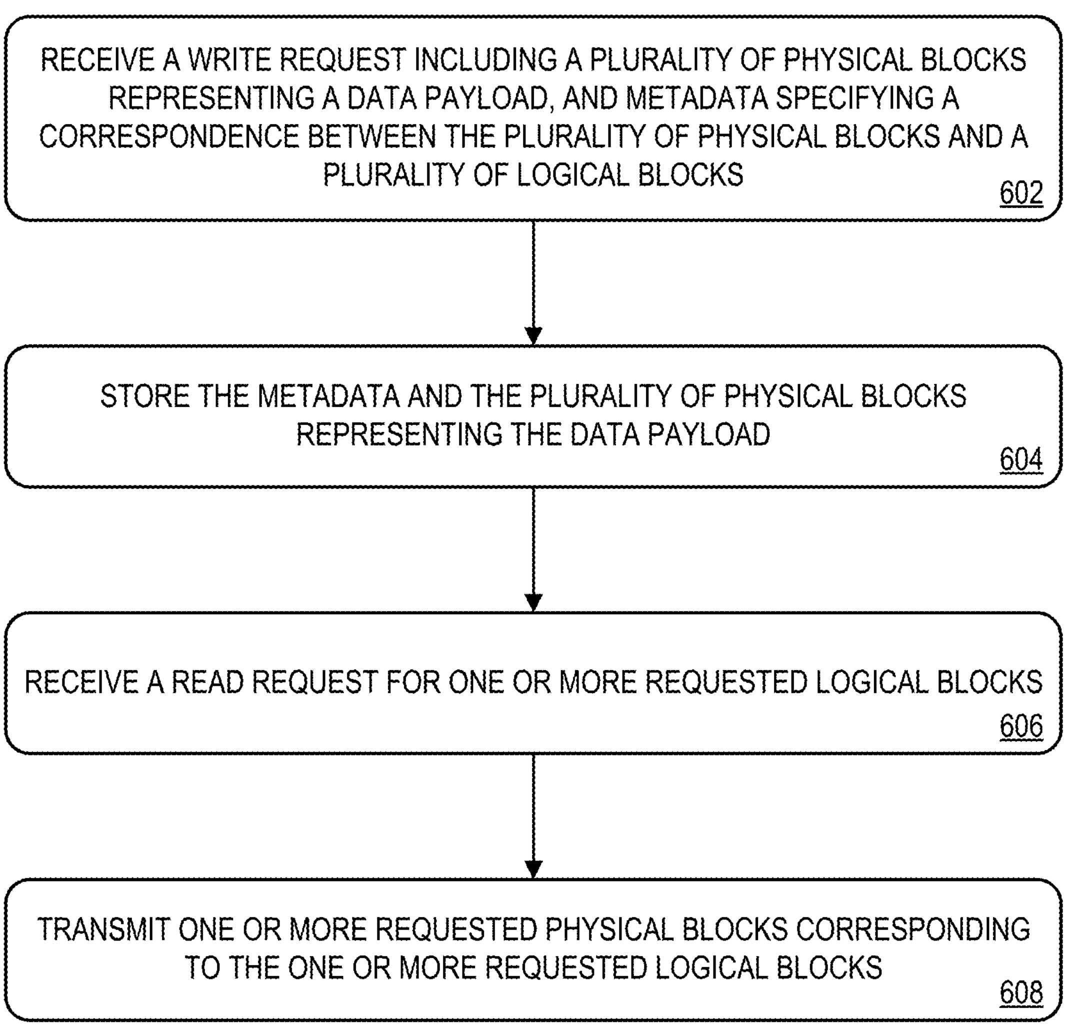

FIG. 6 illustrates another example method 600 for data transmission. Steps of method 600 may be initiated, terminated, and/or looped at any suitable time and in response to any suitable condition. Method 600 is primarily described from the perspective of a target computing device. However, it will be understood that method 600 may be performed by any suitable computing system of one or more computing devices. A computing device implementing steps of method 600 may have any suitable capabilities, hardware configuration, and form factor. As one example, method 600 may be implemented as computing system 700 described below with respect to FIG. 7.

At 602, method 600 includes, at the target computing device, receiving a write request from an initiator computing device using the nonvolatile memory express over fabric (NVMe-oF) protocol. The write request includes a plurality of physical blocks representing a data payload, and metadata specifying a correspondence between the plurality of physical blocks and a plurality of logical blocks having a larger total data size than the plurality of physical blocks. The plurality of physical blocks were previously output by a compression engine of an initiator computing device, by compressing the plurality of logical blocks.

At 604, method 600 includes storing the metadata and the plurality of physical blocks representing the data payload. These may, for instance, be stored in a data blob at the target computing device, or in another suitable way. In cases where a data blob is used, a key value index may associate different logical block addresses with the positions of corresponding physical blocks in the data blob.

At 606, method 600 includes receiving a read request using the NFMe-oF protocol, requesting one or more requested logical blocks. Using the key value index, the target computing device locates the physical blocks corresponding to the requested logical blocks. At 608, method 600 includes transmitting the one or more requested physical blocks to the initiator computing device in a read response. The read response may additionally include metadata specifying a correspondence between the physical blocks and the requested logical blocks. For instance, the metadata may specify, for each logical block address, the quantity of physical blocks corresponding to that logical block.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
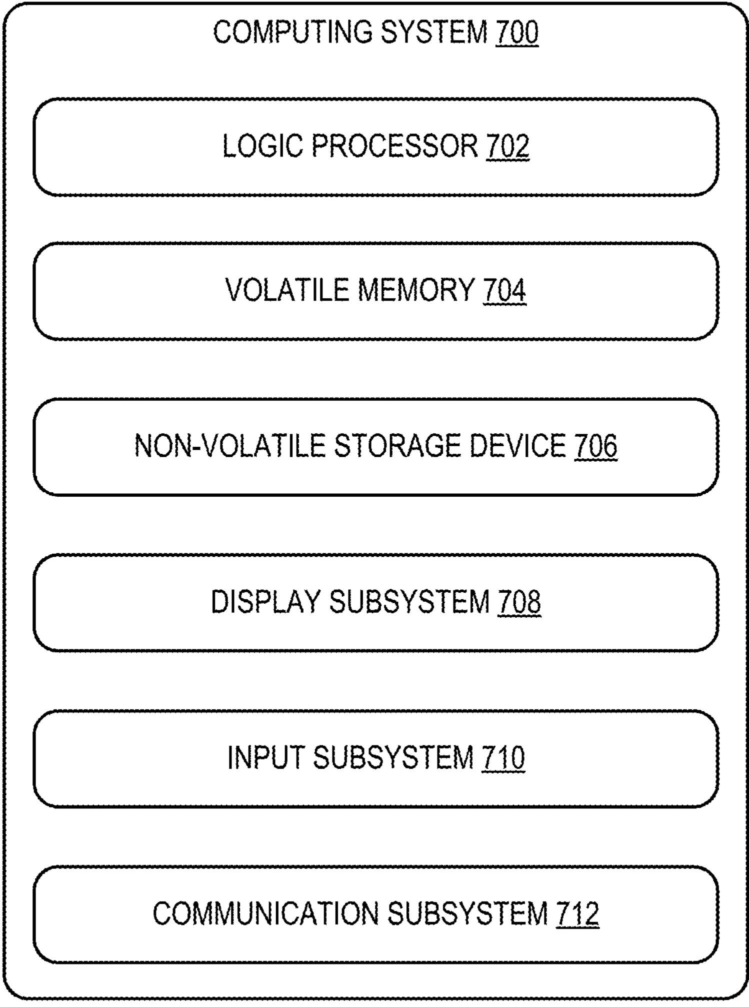
FIG. 7 schematically shows an example computing system.

FIG. 7 schematically shows a non-limiting embodiment of a computing system 700 that can enact one or more of the methods and processes described above. Computing system 700 is shown in simplified form. Computing system 700 may embody the computer device 10 described above and illustrated in FIG. 2. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional description of the subject matter of the present disclosure.

In an example, a method for data transmission comprises: at an initiator computing device, receiving a data payload to be transmitted to a target computing device for storage using the nonvolatile memory express over fabric (NVMe-oF) protocol, wherein the data payload is represented as a plurality of logical blocks; using a compression engine, compressing the data payload into a plurality of physical blocks having a smaller total data size than the plurality of logical blocks; and transmitting, to the target computing device, a write request including the plurality of physical blocks, and metadata specifying a correspondence between each logical block of the plurality of logical blocks and one or more corresponding physical blocks of the plurality of physical blocks. In this example or any other example, the write request specifies a quantity of the plurality of logical blocks and a quantity of the plurality of physical blocks representing the data payload. In this example or any other example, the method further comprises transmitting, to the target computing device, a read request specifying a requested logical block of the plurality of logical blocks, and receiving, from the target computing device, a read response including one or more requested physical blocks of the plurality of physical blocks that represent the requested logical block. In this example or any other example, the read request specifies two or more requested logical blocks, wherein the read response includes two or more requested physical blocks that represent the two or more requested logical blocks, and wherein the read response further includes metadata specifying which of the two or more requested physical blocks correspond to each requested logical block. In this example or any other example, the method further comprises, via the compression engine, decompressing the two or more requested physical blocks to output the two or more requested logical blocks. In this example or any other example, a size of each physical block of the plurality of physical blocks is defined in an NVMe namespace of the target computing device. In this example or any other example, the plurality of physical blocks is a first plurality of physical blocks, and wherein the method further comprises transmitting, to a second target computing device, a second write request including a second plurality of physical blocks having a different block size from the first plurality of physical blocks. In this example or any other example, the metadata and the plurality of physical blocks are stored by the target computing device as a data blob. In this example or any other example, the target computing device maintains a key value index that specifies, for each logical block of the plurality of logical blocks, an offset address within the data blob corresponding to one or more physical blocks of the plurality of physical blocks that represent the logical block. In this example or any other example, the key value index further specifies a length of the one or more physical blocks within the data blob.

In an example, an initiator computing device comprises: a processor; and a storage device holding instructions executable by the processor to: receive a data payload to be transmitted to a target computing device for storage using the nonvolatile memory express over fabric (NVMe-oF) protocol, wherein the data payload is represented as a plurality of logical blocks; using a compression engine, compress the data payload into a plurality of physical blocks having a smaller total data size than the plurality of logical blocks; and transmit, to the target computing device, a write request including the plurality of physical blocks, and metadata specifying a correspondence between each logical block of the plurality of logical blocks and one or more corresponding physical blocks of the plurality of physical blocks. In this example or any other example, the instructions are further executable to transmit, to the target computing device, a read request specifying a requested logical block of the plurality of logical blocks, and receive, from the target computing device, a read response including one or more requested physical blocks of the plurality of physical blocks that represent the requested logical block. In this example or any other example, the read request specifies two or more requested logical blocks, wherein the read response includes two or more requested physical blocks that represent the two or more requested logical blocks, and wherein the read response further includes metadata specifying which of the two or more requested physical blocks correspond to each requested logical block. In this example or any other example, the instructions are further executable to, via the compression engine, decompress the two or more requested physical blocks to output the two or more requested logical blocks. In this example or any other example, a size of each physical block of the plurality of physical blocks is defined in an NVMe namespace of the target computing device. In this example or any other example, the plurality of physical blocks is a first plurality of physical blocks, and wherein the instructions are further executable to transmit, to a second target computing device, a second write request including a second plurality of physical blocks having a different block size from the first plurality of physical blocks. In this example or any other example, the metadata and the plurality of physical blocks are stored by the target computing device as a data blob. In this example or any other example, the target computing device maintains a key value index that specifies, for each logical block of the plurality of logical blocks, an offset address within the data blob corresponding to one or more physical blocks of the plurality of physical blocks that represent the logical block. In this example or any other example, the key value index further specifies a length of the one or more physical blocks within the data blob.

In an example, a method for data transmission comprises: at a target computing device, receiving a write request from an initiator computing device using the nonvolatile memory express over fabric (NVMe-oF) protocol, the write request including a plurality of physical blocks representing a data payload, and metadata specifying a correspondence between the plurality of physical blocks and a plurality of logical blocks having a larger total data size than the plurality of physical blocks, wherein the plurality of physical blocks are output by a compression engine after compressing the plurality of logical blocks; storing the metadata and the plurality of physical blocks representing the data payload; receiving a read request from the initiator computing device using the NVMe-oF protocol, the read request requesting one or more requested logical blocks of the plurality of logical blocks; and transmitting, to the initiator computing device, one or more requested physical blocks corresponding to the one or more requested logical blocks.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for data transmission, the method comprising:
   at an initiator computing device, receiving a data payload to be transmitted to a target computing device for storage using the nonvolatile memory express over fabric (NVMe-oF) protocol, wherein the data payload is represented as a plurality of logical blocks;
   using a compression engine, compressing the data payload into a plurality of physical blocks having a smaller total data size than the plurality of logical blocks, wherein each logical block is compressed into at least one corresponding physical block; and
   transmitting, to the target computing device, a write request including the plurality of physical blocks, and metadata specifying, for each logical block of the plurality of logical blocks, a correspondence between the logical block and the at least one corresponding physical block, the correspondence including a quantity of the at least one corresponding physical block into which the logical block is compressed.

2. The method of claim 1, wherein the write request specifies a quantity of the plurality of logical blocks and a quantity of the plurality of physical blocks representing the data payload.

3. The method of claim 1, further comprising transmitting, to the target computing device, a read request specifying a requested logical block of the plurality of logical blocks, and receiving, from the target computing device, a read response including one or more requested physical blocks of the plurality of physical blocks that represent the requested logical block.

4. The method of claim 3, wherein the read request specifies two or more requested logical blocks, wherein the read response includes two or more requested physical blocks that represent the two or more requested logical blocks, and wherein the read response further includes metadata specifying which of the two or more requested physical blocks correspond to each requested logical block.

5. The method of claim 4, further comprising, via the compression engine, decompressing the two or more requested physical blocks to output the two or more requested logical blocks.

6. The method of claim 1, wherein a size of each physical block of the plurality of physical blocks is defined in an NVMe namespace of the target computing device.

7. The method of claim 1, wherein the plurality of physical blocks is a first plurality of physical blocks, and wherein the method further comprises transmitting, to a second target computing device, a second write request including a second plurality of physical blocks having a different block size from the first plurality of physical blocks.

8. The method of claim 1, wherein the metadata and the plurality of physical blocks are stored by the target computing device as a data blob.

9. The method of claim 8, wherein the target computing device maintains a key value index that specifies, for each logical block of the plurality of logical blocks, an offset address within the data blob corresponding to one or more physical blocks of the plurality of physical blocks that represent the logical block.

10. The method of claim 9, wherein the key value index further specifies a length of the one or more physical blocks within the data blob.

11. An initiator computing device, comprising:
   a processor; and
   a storage device holding instructions executable by the processor to:
      receive a data payload to be transmitted to a target computing device for storage using the nonvolatile memory express over fabric (NVMe-oF) protocol, wherein the data payload is represented as a plurality of logical blocks;
      using a compression engine, compress the data payload into a plurality of physical blocks having a smaller total data size than the plurality of logical blocks, wherein each logical block is compressed into at least one corresponding physical block; and
      transmit, to the target computing device, a write request including the plurality of physical blocks, and metadata specifying, for each logical block of the plurality of logical blocks, a correspondence between the logical block and the at least one corresponding physical block, the correspondence including a quantity of the at least one corresponding physical block into which the logical block is compressed.

12. The initiator computing device of claim 11, wherein the instructions are further executable to transmit, to the target computing device, a read request specifying a requested logical block of the plurality of logical blocks, and receive, from the target computing device, a read response including one or more requested physical blocks of the plurality of physical blocks that represent the requested logical block.

13. The initiator computing device of claim 12, wherein the read request specifies two or more requested logical blocks, wherein the read response includes two or more requested physical blocks that represent the two or more requested logical blocks, and wherein the read response further includes metadata specifying which of the two or more requested physical blocks correspond to each requested logical block.

14. The initiator computing device of claim 13, wherein the instructions are further executable to, via the compression engine, decompress the two or more requested physical blocks to output the two or more requested logical blocks.

15. The initiator computing device of claim 11, wherein a size of each physical block of the plurality of physical blocks is defined in an NVMe namespace of the target computing device.

16. The initiator computing device of claim 15, wherein the plurality of physical blocks is a first plurality of physical blocks, and wherein the instructions are further executable to transmit, to a second target computing device, a second write request including a second plurality of physical blocks having a different block size from the first plurality of physical blocks.

17. The initiator computing device of claim 11, wherein the metadata and the plurality of physical blocks are stored by the target computing device as a data blob.

18. The initiator computing device of claim 17, wherein the target computing device maintains a key value index that specifies, for each logical block of the plurality of logical blocks, an offset address within the data blob corresponding to one or more physical blocks of the plurality of physical blocks that represent the logical block.

19. The initiator computing device of claim 11, wherein the key value index further specifies a length of the one or more physical blocks within the data blob.

20. A method for data transmission, the method comprising:

at a target computing device, receiving a write request from an initiator computing device using the nonvolatile memory express over fabric (NVMe-oF) protocol, the write request including a plurality of physical blocks representing a data payload, wherein the plurality of physical blocks are output by a compression engine of the initiator computing device through compression of a plurality of logical blocks, wherein each logical block of the plurality of logical blocks corresponds to at least one corresponding physical block, and wherein the write request further includes metadata specifying, for each logical block of the plurality of logical blocks, a correspondence between the logical block and the at least one corresponding physical block, the correspondence including a quantity of the at least one corresponding physical block into which the logical block is compressed;

storing the metadata and the plurality of physical blocks representing the data payload;

receiving a read request from the initiator computing device using the NVMe-oF protocol, the read request requesting one or more requested logical blocks of the plurality of logical blocks; and transmitting, to the initiator computing device, one or more requested physical blocks corresponding to the one or more requested logical blocks.

* * * * *